(12) United States Patent
Wager et al.

(10) Patent No.: US 8,218,488 B2
(45) Date of Patent: Jul. 10, 2012

(54) MANAGING UPLINK RESOURCES IN A CELLULAR RADIO COMMUNICATIONS SYSTEM

(75) Inventors: Stefan Wager, Espoo (FI); Johan Bergman, Kista (SE); Henrik Enbuske, Stockholm (SE); Jose Luis Pradas, Jorvas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 725 days.

(21) Appl. No.: 12/314,247

(22) Filed: Dec. 5, 2008

(65) Prior Publication Data
US 2009/0225709 A1    Sep. 10, 2009

Related U.S. Application Data

(60) Provisional application No. 61/015,316, filed on Dec. 20, 2007.

(51) Int. Cl.
*H04W 4/00* (2009.01)
(52) U.S. Cl. .................... 370/329; 370/431; 455/450
(58) Field of Classification Search .............. 370/329, 370/431; 455/422.1, 450
See application file for complete search history.

(56) References Cited

U.S. PATENT DOCUMENTS

| | | | |
|---|---|---|---|
| 2004/0116143 A1 | 6/2004 | Love et al. | |
| 2007/0049309 A1 | 3/2007 | Pan et al. | |
| 2009/0086671 A1* | 4/2009 | Pelletier et al. | 370/329 |
| 2009/0109912 A1* | 4/2009 | DiGirolamo et al. | 370/329 |
| 2009/0131052 A1* | 5/2009 | Hakola et al. | 455/435.2 |

FOREIGN PATENT DOCUMENTS
WO    WO 2007/023351    1/2007

OTHER PUBLICATIONS

Pelletier et al, "Method and Apparatus for Terminating Transmission of a Message in an Enhanced Random Access Channel", U.S. Appl. No. 60/975,985, filed Sep. 28, 2007.*
3GPP TS 25.331 v7.6.0, $3^{rd}$ Generation Partnership Project; Technical Specification Group Radio Access Network; Radio Resource Control; Protocol Specification (Release 7), (Sep. 2007) pp. 1-1425.
3GPP TS 25.321 v&.6.0, $3^{rd}$ Generation Partnership Project; Technical Specification Group Radio Access Network; Medium Access Control (MAC) protocol specification (Release 7), (Sep. 2007), pp. 1-121.
European Search Report, Jul. 1, 2011, in corresponding European Application No. 10164034.
Qualcomm Europe: "Layer ½ Aspects for Enhanced UL for CELL_FACH", 3GPP Draft; R2-074390, Oct. 1, 2007, XP050136960.
M. Wimmer—NSN: "Status Report for WI to 1-8 TSG—Work Item: Enhanced Uplink for CELL_FACH State in FDD", No. RP-070825, Nov. 27, 2007, pp. 1-4, XP002514178.

* cited by examiner

*Primary Examiner* — Luat Phung
(74) *Attorney, Agent, or Firm* — Nixon & Vanderhye P.C.

(57) ABSTRACT

The technology in this application provides a method and apparatus for efficiently using common uplink radio resources, e.g. a common uplink enhanced-dedicated physical channel (E-DCH) resource. A UE releases a common E-DCH resource very quickly after a completed transmission. In addition or alternatively, a base station may release a common E-DCH resource configuration from the network side to free up common E-DCH resources for use by other UEs. A low overhead signaling scheme for quickly and effectively releasing of common E-DCH resources between a UE and a base station is also described. For example, existing signaling fields on protocol layer 2 (L2) or layer 1 (L1) may be used. In one preferred example embodiment, signaling fields already in use in a CELL_DCH service state are given a different meaning for UEs in a CELL_FACH service state so that common E-DCH resources are quickly and effectively released.

4 Claims, 8 Drawing Sheets

MANAGING UPLINK RESOURCES IN A CELLULAR RADIO COMMUNICATIONS SYSTEM

PRIORITY APPLICATION

This application claims the priority benefit of U.S. provisional application 61/015,316, entitled "Method and Arrangement in a Telecommunications System," filed on Dec. 20, 2007, the contents of which are incorporated here by reference.

TECHNICAL FIELD

The technology pertains to the cellular radio communications, and particularly, to managing uplink radio resources allocated to mobile terminals for transmitting information to a radio access network (RAN).

BACKGROUND AND SUMMARY

The 3rd Generation Partnership Project (3GPP) is a collaboration between groups of telecommunications associations to develop mobile communications systems. Universal Mobile Telecommunications System (UMTS) is one of the third-generation (3G) cell phone technologies, which is also being developed into a 4G technology. The most common form of UMTS uses Wideband-CDMA as the underlying air interface. Evolved UMTS Terrestrial Radio Access (E-UTRA) is the air interface of 3GPP's Long Term Evolution (LTE) upgrade path for mobile networks. E-UTRA is the successor to High Speed Downlink Packet Access (HSDPA) and High Speed Uplink Packet Access (HSUPA) technologies specified in 3GPP releases 5, 6 and 7. Unlike HSPA, LTE's E-UTRA is a new air interface system unrelated to W-CDMA. E-UTRA uses Orthogonal Frequency Division Multiplexing (OFDM) and multiple-input multiple-output (MIMO) antenna technology to support more users, higher data rates and lower processing power required on each handset.

Figure 1:
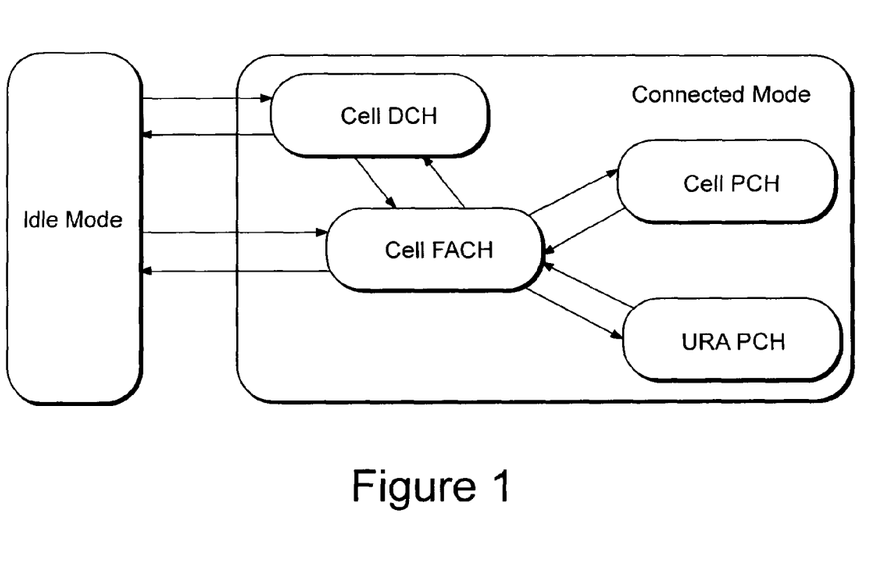
FIG. 1 is an example mode and RRC service state diagram.

In 3GPP Release-8, work is ongoing to improve the uplink performance in what is called the CELL_FACH state. At the radio resource control (RRC) level, two basic operation modes of a mobile radio terminal, sometimes called a user equipment (UE), are idle mode and connected mode as shown in FIG. 1. The connected mode is divided into service states, which define what kind of physical radio channels a UE is using. FIG. 1 also shows the main RRC service states in the connected mode and the transitions between states and between modes. In the CELL_FACH state, no dedicated physical channel is allocated to the UE, but the random access and forward access common channels (RACH and FACH respectively) are used instead. The UE is known on a cell level (i.e., it has a cell id), has a protocol layer 2 connection (including media access control (MAC) and radio link control (RLC) protocol layers), but does not have dedicated physical (PHY) layer 1 radio resources. Instead, common physical layer radio resources are shared between mobile terminals in the CELL_FACH state for transmitting both signaling messages and small amounts of user plane data to UE's in the CELL_FACH state.

An uplink improvement planned for future cellular radio systems is activation in the CELL_FACH state of an uplink enhanced-dedicated channel (E-DCH) physical channel established with HSUPA. The E-DCH is normally used as a dedicated physical layer channel in CELL_DCH state (shown in FIG. 1) with one separate E-DCH resource allocated per UE. This can be performed by using a pool of E-DCH resources that can be temporarily assigned to a UE in the CELL_FACH state. Such a pool of E-DCH resources is termed "common E-DCH resources." The E-DCH resources may be managed by a Radio Network Controller (RNC) in 3G UMTS type systems, but the pool of common E-DCH resources may be managed by the radio base station, sometimes referred to as a NodeB, to speed up the allocation of radio resources by not having to involve an RNC or other management node in the allocation procedure.

The number of common E-DCH resource configurations available in each base station cell is limited by available air interface resources and the number of radio receivers in the base station. The common E-DCH resource configuration is a set of parameters that defines the E-DCH resource, e.g., an uplink scrambling code, a F-DPCH code and offset, and E-DCH HARQ Acknowledgement Indicator Channel (E-HICH) and E-DCH Relative Grant Channel (E-RGCH) Information. The common E-DCH resource assignment scheme may also place requirements on how many E-DCH radio resources can be assigned at one time. Given that the set of common E-DCH resources and configurations available in each cell is limited, E-DCH resources need to be efficiently used and managed.

The technology in this application provides a method and apparatus for efficiently using E-DCH resources. A UE can release common E-DCH resources very quickly after a completed transmission. In addition or alternatively, a base station may release common E-DCH configurations from the network side to free up common E-DCH resources for use by other UEs. Various signaling schemes for quickly and effectively releasing common E-DCH resources between a UE and a base station are also provided. For example, existing signaling fields already in use in a CELL_DCH service state may be given a different meaning for UEs in a CELL_FACH service state so that common E-DCH resources are quickly and effectively released. Alternatively, a new message or a new field in an existing message may be used.

In one example embodiment, a UE in a CELL_FACH state releases an E-DCH resource allocated to the UE. When the UE determines that the common E-DCH resource allocated to the UE should be released, it signals to the base station release of the common E-DCH resource on existing protocol layer 1 or protocol layer 2 message fields already in use in a CELL_DCH state for other purposes. In one example scenario, the common E-DCH resource is released when the UE detects that its transmit buffer is empty. The UE may signal the release to the base station by including a Scheduling Information (SI) field in a last Media Access Control (MAC) Packet Data Unit (PDU) stored in the transmit buffer which is sent by the UE using the common E-DCH resource. If the transmit buffer is an E-DCH buffer, the SI field indicates a total E-DCH buffer status of zero. The UE can signal the release of the common E-DCH resource to the base station by setting an E-DCH-Transport Format Combination Identifier (E-TFCI) or a happy bit on a physical layer control channel to indicate release of the common E-DCH resource.

In one example variation, the UE releases the common E-DCH resource upon receiving an Acknowledgement (ACK) for all outstanding Hybrid Automatic Repeat Request (HARQ) processes associated with the UE's transmissions to the base station using the allocated common E-DCH resource or upon reaching a predetermined maximum number of HARQ transmissions. The common E-DCH resource may also be released when an HARQ reordering timer has expired for the last MAC PDU.

In another example embodiment, a radio base station releases a common E-DCH resource allocated for use by a UE in a CELL_FACH state. The radio base station determines that the common E-DCH resource allocated to the UE should be released and then sends a grant on a common E-DCH resource grant channel indicating an inactive grant for the UE as a command to the UE to release the common E-DCH resource. The inactive grant on the common E-DCH resource grant channel means that the release is executed even though there may be outstanding unfinished Hybrid Automatic Repeat Request (HARQ) processes associated with the UE's transmissions to the base station using the allocated common E-DCH resource.

In another example embodiment, a release timer may be set with a predetermined value, and the common E-DCH resource may be released upon expiry of the release timer. The common E-DCH resource release timer is started when the common E-DCH resource is assigned to a UE and stopped when uplink transmission has been detected from the UE on the common E-DCH resource. The common E-DCH resource release timer may be implemented in the UE, the base station, or both.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

Figure 2:
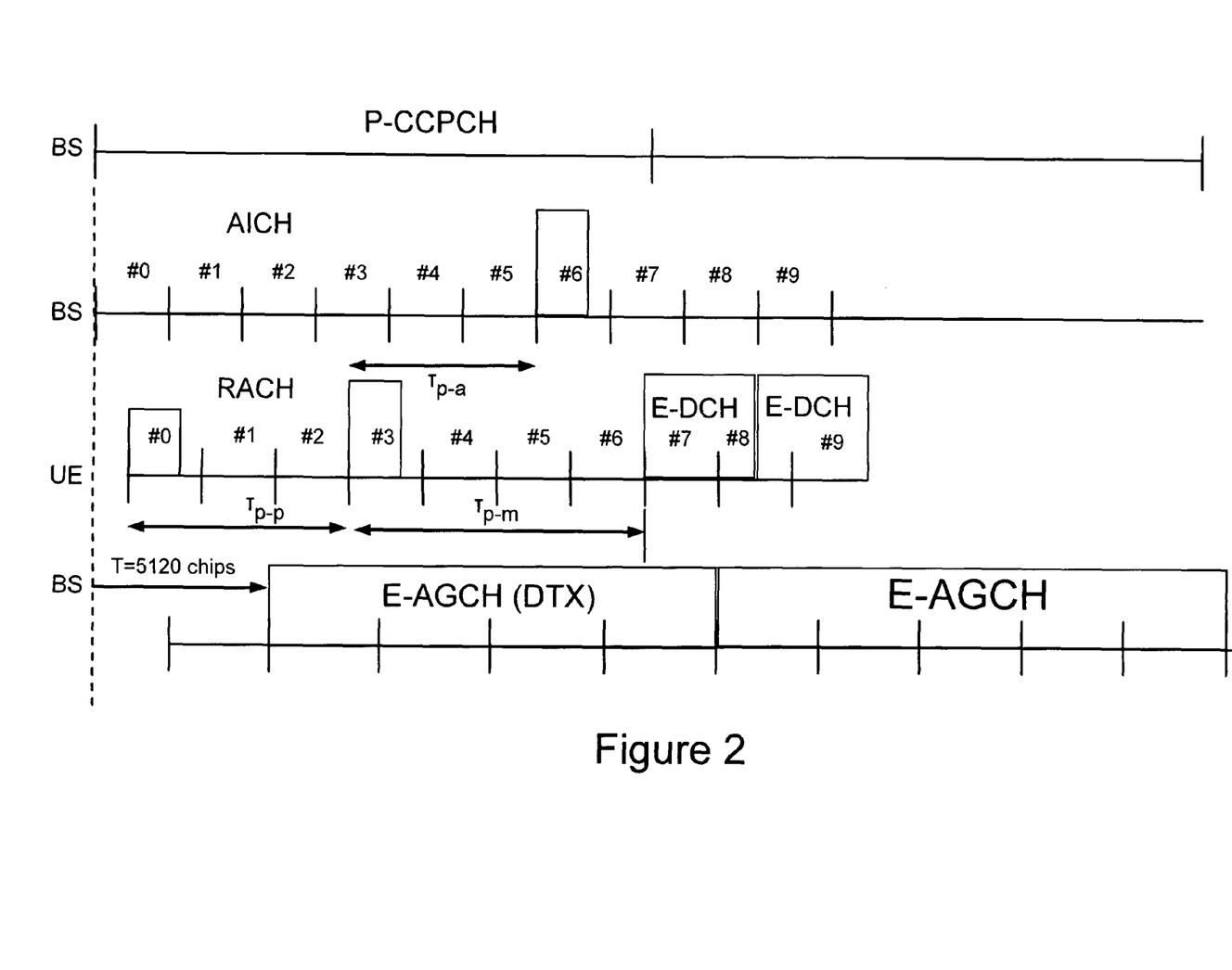
FIG. 2 is a non-limiting example signaling diagram showing signaling relating to common E-DCH resource allocation and configuration.

As explained in the background, base stations (NodeBs) broadcast common E-DCH configurations located in their respective cells. Reference is now made to FIG. 2 to explain one proposed example of how common E-DCH resources may be acquired in 3GPP release 8. The base station (BS) transmits over a primary-common control physical channel (P-CCPCH) to provide downlink frame and acquisition indicator channel (AICH) timing information for UEs in the cell. The AICH is used by the base station to indicate reception of the RACH signature sequence over the random access channel (RACH) from a mobile terminal in the CELL_FACH state. The AICH echoes back an identical signature sequence as received on the RACH. In FIG. 2, the UE in the CELL_FACH state needs common E-DCH resources to communicate with the radio access network and sends a RACH request in time slot #0 at an initial low amplitude level. The base station does not receive that first RACH request because there is no AICH transmission. The UE sends a second preamble on the RACH after Tp-p in time slot #3 at a higher amplitude because UEs is often use a power ramping procedure on initial requests on the RACH. The base station receives and acknowledges the second preamble in time slot #6 on the AICH. In the AICH acknowledgement, the base station echoes back the same second preamble signature sequence and also informs the UE which common E-DCH resource it has assigned to the UE.

A common E-DCH resource is defined in the non-limiting example of Release 8 by: an Uplink (UL) scrambling code, a Fractional-Dedicated Physical Channel (F-DPCH) code and timing offset, an E-DCH Absolute Grant Channel (E-AGCH)/E-DCH Relative Grant Channel (E-RGCH)/E-DCH HARQ Acknowledgement Indicator Channel (E-HICH) codes and signatures, and High Speed Dedicated Physical Control Channel (HS-DPCCH) parameters such as power offsets and Channel Quality Indicator (CQI). The UE may transmit on the common E-DCH after receiving the AICH acknowledgement. The E-DCH Absolute Grant Channel (E-AGCH) from the base station to the UEs is also shown at the bottom of FIG. 2. In the first E-AGCH frame, there is no transmission to the requesting UE, i.e., a discontinuous transmission (DTX). But in the second E-AGCH frame, the UE starts to monitor the E-AGCH for a confirmation of the uplink common E-DCH transmission which provides contention resolution. Before contention resolution, all transmissions on the common E-DCH resource must include the UE-specific E-RNTI in the MAC PDU to identify the UE. The uplink common E-DCH transmission is confirmed by the NodeB sending a grant on the E-AGCH with the UE specific E-RNTI. When contention is resolved in this way, the UE's E-RNTI is no longer needed in each MAC PDU. But contention resolution is not the problem addressed in this application. Rather, that problem relates to how the common E-DCH resource is released after completed uplink transmission by the UE. Because there is a limited set of common E-DCH resources in a system, a quick release is important to achieve good efficiency and increase capacity.

The technology in this application solves this and other problems by either the UE or the base station or both nodes detecting a condition that results in the UE stopping use of and releasing a common uplink radio resource so that the common uplink radio resource can by used by other UEs. For purposes of description only, the common E-DCH resource is used as a non-limiting example of such a common uplink radio resource. UEs that are using the common uplink resource are typically in a state similar to the CELL_FACH service state discussed above, but other states where the UE is using a common uplink radio resource like the E-DCH are included.

The UE can make the decision to release the common uplink radio resource implicitly based on one or more detected conditions. One example condition is that the UE detects it has no more data in its transmit buffer to send. Another example condition is that a maximum time for using the common uplink radio resource has expired.

The base station can make the release decision and explicitly command the UE to release the common uplink radio resource. For example, such an explicit release command may be sent when the base station detects that the UE has no more data in its transmit buffer or that a time out period has expired.

Preferably, though not necessarily, the release of the common E-DCH resource is signaled between the UE and the base station using existing signaling fields, e.g., existing signaling field(s) on protocol layer 2 (L2) or layer 1 (L1). For example, in example embodiments described below, certain signaling fields already in use in a CELL_DCH state are used but with a different signaling field content interpretation for UEs in a CELL_FACH state. When the common E-DCH resource is released by the UE, and new data is received from a higher protocol layer to be transmitted, the UE starts over and must request transmission by transmitting one or more RACH preambles to request a new common E-DCH resource.

In accordance with one non-limiting example embodiment, a UE in CELL_FACH state triggers release of the common E-DCH resource when the UE has emptied its Radio Link Protocol (RLC) transmit buffer. The UE includes an indicator in the already existing Scheduling Information (SI) field in the last Media Access Control (MAC) Packet Data Unit (PDU) transmitted from the RLC buffer indicating a transmit buffer status=0. The SI field is part of an existing message already used for the E-DCH. In particular, the Total E-DCH Buffer Status (TEBS), which is already used to request scheduling for E-DCH, can be set to 0 to indicate an empty buffer. This informs the base station that the UE is releasing the common E-DCH resource. For UEs in CELL_FACH state, the base station interprets TEBS=0 in the SI field of the last MAC PDU as a signal that the UE is finished transmitting on the common E-DCH resource. In this way, both the UE and the base station promptly release the common E-DCH resource. An added benefit is achieved if already-existing signaling fields can be used to communicate this information as in this non-limiting example. But the indication may be communicated using a new message field or a new message altogether.

In a variation on this example embodiment, the radio base station releases the common E-DCH resource after all Hybrid Automatic Repeat Request (HARQ) processes associated with this UE's transmission on the common E-DCH resource are finished. Parallel HARQ processes are used in many modern wireless communications systems to detect and correct data errors caused during transmission over the radio interface. Even when the HARQ process carrying the last MAC PDU with the SI field is completed, there may still be previous HARQ processes that are not yet completed.

Figure 3:
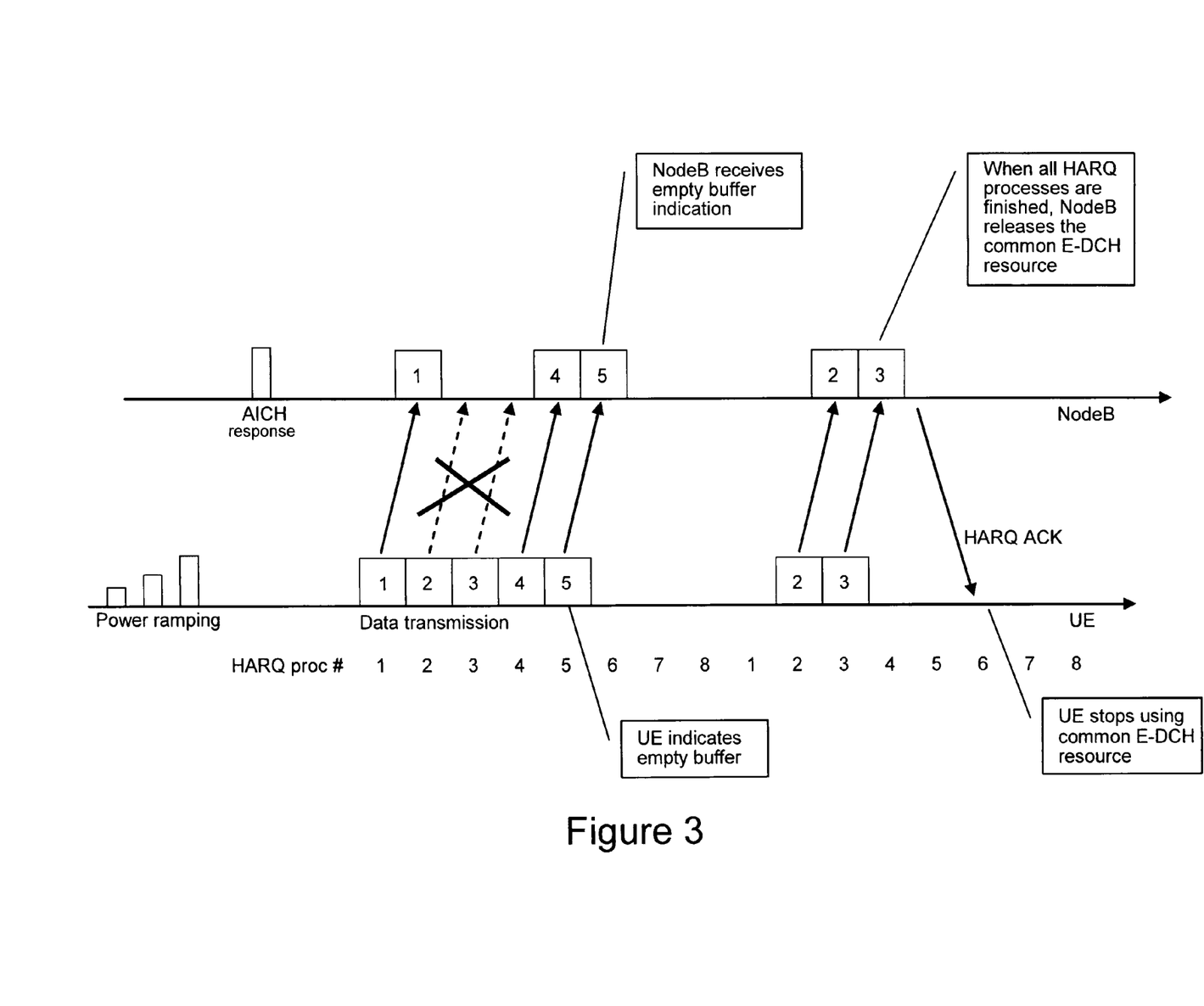
FIG. 3 is a diagram showing one non-limiting example of reliably and efficiently ending a UE's use of a common E-DCH resource.

FIG. 3 is a diagram showing a non-limiting example context for reliably and efficiently ending a UE's use of common E-DCH resource. The UE is in a CELL_FACH service state (described above) and performs the power ramping procedure on the RACH sending a request for the common E-DCH until an AICH response from the base station (NodeB) is received. If a positive acquisition indicator corresponding to the selected signature is detected on the AICH, the UE starts transmitting data uplink frames 1-5, e.g., packet data units (PDUs) 1-5, with the common E-DCH resource using multiple HARQ processes. Here, five HARQ processes are running, one for each transmitted uplink PDUs 1-5. The base station satisfactorily receives PDUs 1, 4, and 5 and so ends HARQ processes 1, 4, and 5. In addition, the UE includes an "empty buffer" indication in the last PDU 5 to indicate to the base station that the UE does not have any immediate data to send on the common E-DCH. As a result, the quicker the base station can release the common E-DCH resource being used by this UE, the sooner other UEs with immediate data to send via the common E-DCH resource can be serviced. In one example embodiment, as soon as the UE sends the empty buffer indication, the UE may release the common E-DCH resource.

On the other hand, data frames 2 and 3 were not satisfactorily received by the base station in this example. So rather than immediately freeing up the common E-DCH resources after receiving PDU 5, the base station may wait until data frames 2 and 3 are received, thereby finishing two "open" HARQ processes for the common E-DCH resource for this UE. The base station then sends an HARQ acknowledgement to the UE, which then stops using the common E-DCH resource.

Alternatively or in addition, either the UE or the base station may release the common E-DCH resource to make it available for use by other UEs when a timer expires. For example, there may be a timer started when the common E-DCH resource is granted/allocated to the UE. Once a predetermined time period expires for that UE's use of the common E-DCH resource, the common E-DCH resource is released. Such a timer may be located in the base station, the UE, or both. It may be desirable to reset such a timer so that it does not time-out if the UE continuously transmits PDUs. Alternatively or in addition, a maximum number of PDU retransmissions counter may be employed to limit the amount of time waited for outstanding HARQ processes to finish.

Figure 4:
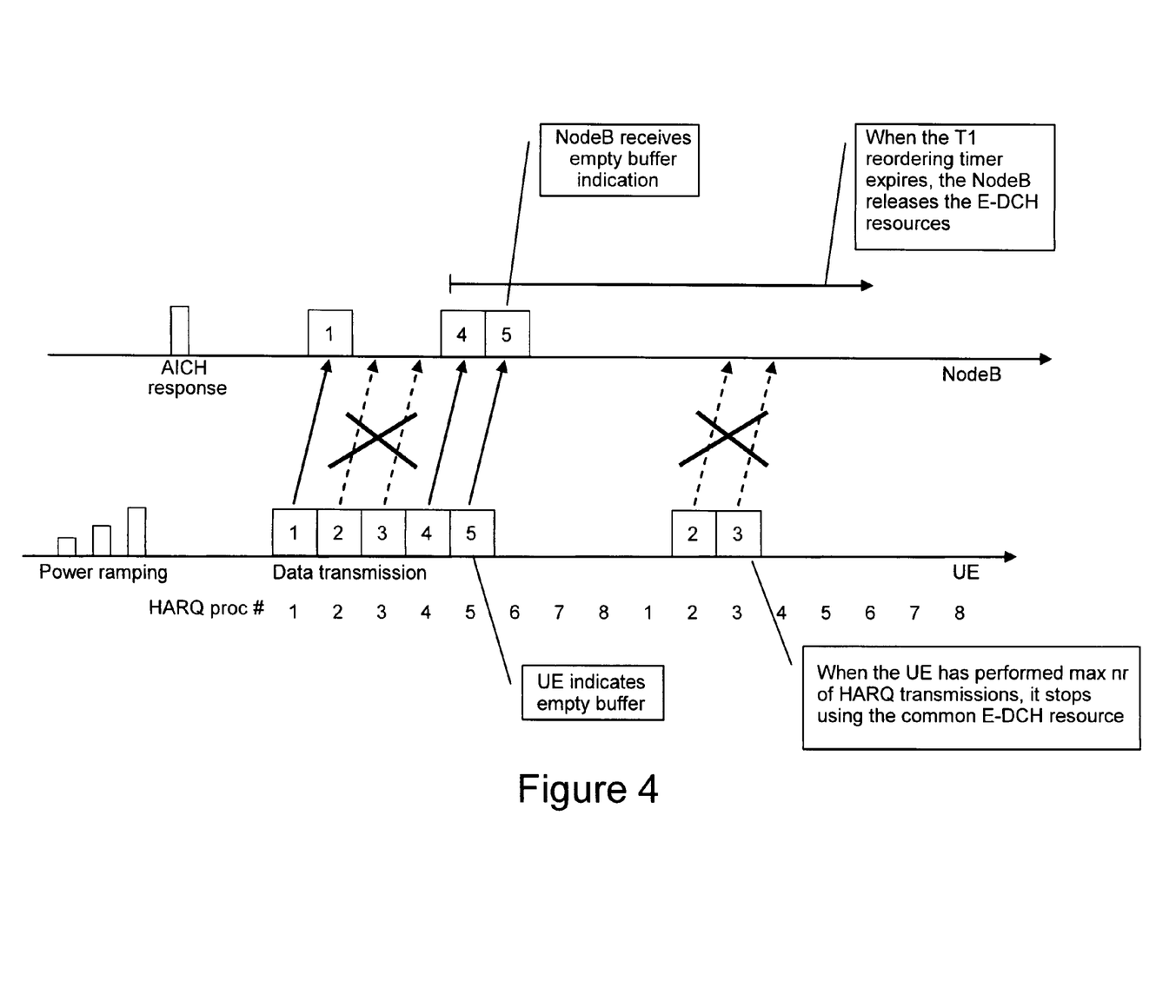
FIG. 4 is a diagram showing another non-limiting example of reliably and efficiently ending a UE's use of a common E-DCH resource.

FIG. 4 shows an example where an HARQ reordering timer (e.g., a T1 timer in 3GPP) is used as a timeout mechanism. The T1 timer controls "stall avoidance" in a MAC SDU reordering buffer to ensure in-sequence delivery of MAC SDUs to the RLC layer in case of HARQ retransmissions. If a gap in the MAC PDU Transmit Sequence Number (TSN) is detected, MAC SDU reassembly is stopped, and the T1 timer is started. If the missing TSN is received, then the MAC SDU reassembly continues, and the T1 timer is reset. If the missing TSN(s) are not received by the time the T1 timer expires, then the MAC SDU reassembly continues with missing or incomplete MAC SDUs being dropped and the T1 timer reset. The scenario is similar to that described for FIG. 3, except that the second transmission of MAC PDUs 2 and 3 is also unsuccessful. The UE may release the common E-DCH resource once it has received an acknowledgement (ACK) for all HARQ processes. But it may be undesirable for retransmissions to continue after a predetermined time period. If a UE empty buffer indication is received and/or the reordering timer or other suitable timer times out, then the base station may release the common E-DCH resource even though PDUs 2 and 3 have not yet been correctly received.

The use of a release timer to release the common E-DCH resource can also be helpful in the event there are signaling errors, e.g., lost MAC PDUs or the UE is unable to accurately decode the E-AGCH, or if a UE has moved out of coverage for the base station. For example, the base station can start the release timer when the common E-DCH resource is assigned to a UE. Once the base station detects an uplink transmission, the release timer is stopped and preferably reset. Detection of uplink transmission can, for example, be based on thresholds for the estimated Bit Error Rate (BER), Signal to Noise Ratio (SNR), or a similar signal strength/quality parameter for the uplink control channel, e.g., the DPCCH. If the uplink DPCCH is lost during transmission, e.g., due to a UE moving out of coverage, the release timer is again started. If the uplink DPCCH is not detected from that UE before the release timer expires, the base station releases the common E-DCH resource for use by other UEs.

The radio base station may also stop a UE from transmitting on a common E-DCH resource by sending a scheduling or grant message, e.g., by sending a grant message on the E-AGCH, indicating INACTIVE. The grant value set to INACTIVE functions as a common E-DCH resource release command to the UE. For example, when the UE receives an E-AGCH identifying the UE, (e.g., with the UE's E-RNTI), with the absolute grant value set to INACTIVE on all HARQ processes, the UE releases the common E-DCH resource to make it available for use by other UEs.

In another non-limiting example embodiment, the UE may use an special value of the E-DCH-Transport Format Combination Identifier (E-TFCI) or Happy Bit on the physical layer control channel E-DPCCH to indicate release of the common E-DCH resource. The Happy Bit is a single bit field in the E-DPCCH that is used to indicate whether the UE could use more resources or not. To use the Happy Bit to signal the common E-DCH resource release would require a new definition for the Happy Bit for Enhanced CELL_FACH, different from the current E-DCH definition for CELL_DCH. For instance, "Happy" could mean the UE is done with the uplink transmission and "Unhappy" would mean there is still data to transmit, or vice versa.

Since such indicators can be prone to error because they are not covered by physical layer error correcting and error detecting codes used for higher layer data, in another example embodiment, the E-TCFI is used in combination with the UE sending an empty buffer indicator in the SI field in the last PDU as described above. In this way, both explicit (command from the base station) and implicit (indicator from the UE) techniques are used to ensure fast and reliable release of the common E-DCH resource.

In summary, when the UE determines that a common E-DCH resource is to be released, e.g., the UE's transmit buffer is empty, the UE signals to radio base station the release of the common E-DCH resource. In response, the base station releases the corresponding common E-DCH resource which then can be used for another user. Alternatively or in addition, the base station determines that a common E-DCH resource is to be released and sends a suitable "stop and release" command to the UE. A release timer is started when a common E-DCH resource is assigned to a UE. If uplink transmission is detected before the timer expires, the timer is stopped and preferably reset. If not, the common E-DCH resource is released by the base station and the UE. Preferably, existing message fields can be used for any signaling between the UE and base station related to releasing the common E-DCH resource.

Figures 5A, 5B:
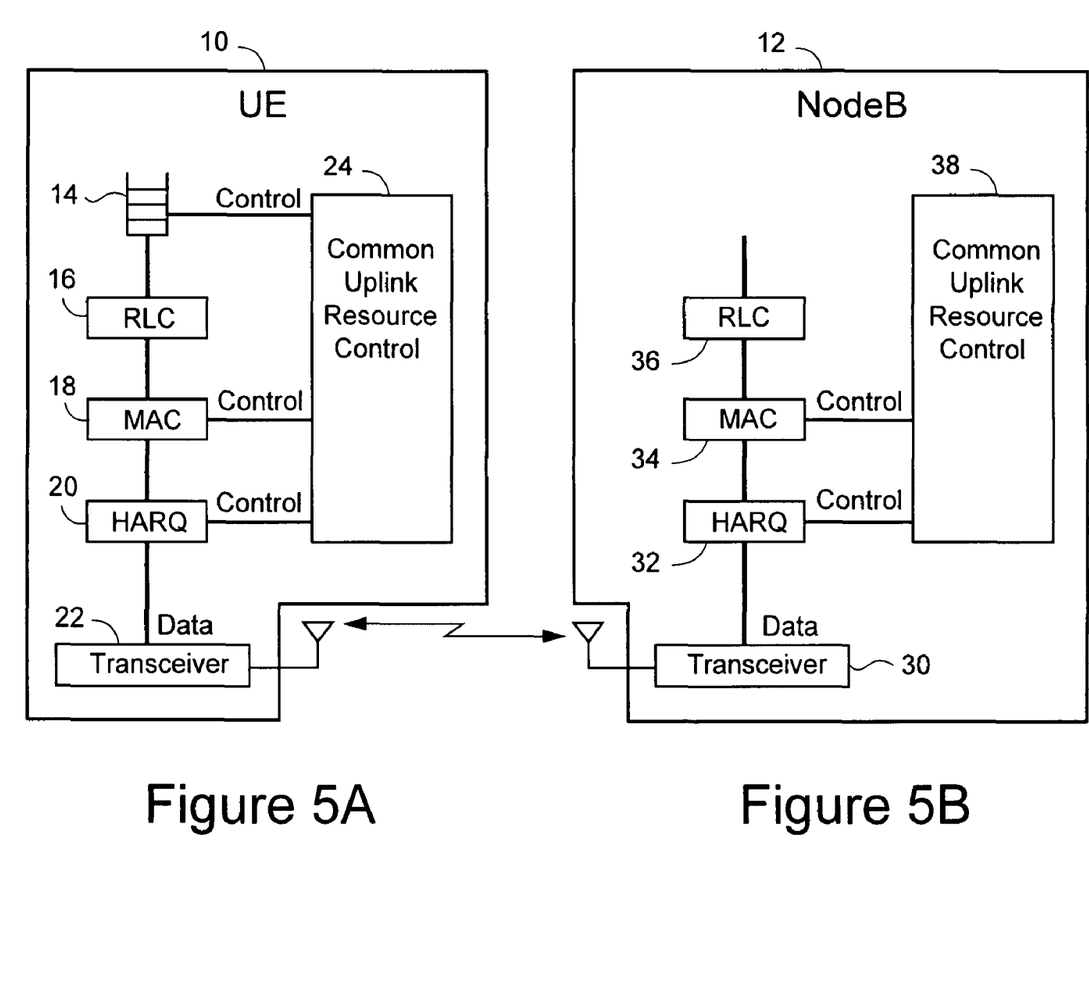
FIG. 5A is a non-limiting function block diagram of a UE for using and managing a common E-DCH or other uplink radio resource.
FIG. 5B is non-limiting function block diagram of a NodeB base station for controlling a common E-DCH or other uplink radio resource in conjunction with the UE shown in FIG. 5A.

FIG. 5A is non-limiting function block diagram of a UE 10 for using and managing a common E-DCH or other uplink radio resource assuming the common E-DCH or other uplink radio resource is allocated to the UE. The UE 10 includes a transmission buffer 14 with packets or other data units to be sent to the radio network via the NodeB base station 12 shown in FIG. 5B. These packets are sent to a radio link controller (RLC) 16 which performs various radio link control layer functions such as retransmission and segmentation. The RLC 16 sends RLC packets to a media access controller (MAC) 18 which performs various MAC layer functions such as logical channel multiplexing, priority handling and Transport Format Combination (TFC) selection. The MAC generates MAC packet data units (PDUs) that are processed by an HARQ controller 20 shown separately though it is part of the MAC protocol. The HARQ controller 20 establishes a corresponding HARQ process for each MAC PDU transmitted and sends the MAC PDUs to a radio transceiver 22 for transmission via an antenna over the radio interface to the base station 12.

A common uplink resource controller 24, (e.g., the uplink resource may be the common E-DCH resource), can monitor the RLC transmit buffer 14, and if it detects no more data packets in the buffer 14, i.e., an empty buffer, it instructs the MAC controller 18 to insert an empty buffer indicator in the last MAC PDU for this UE to be transmitted. The MAC controller 18 may insert the indicator into an existing control field of the MAC PDU, or there may be a dedicated field for the empty buffer indicator. Preferably, the empty buffer indicator is included in an already existing field such as fields that have been established for control messages in another service state like the DCH state. The non-limiting example given above included the SI field of the last MAC PDU. The common uplink resource controller 24 also may employ one or more timers to determine whether a time period for using the common E-DCH resource has expired, and if so, to stop sending data for this UE using the common E-DCH resource.

FIG. 5B is non-limiting function block diagram of a NodeB base station 12 for controlling a common E-DCH resource assumed to have been allocated to the UE 10 shown in FIG. 5A. The base station 12 receives control signaling and data (baseband information) from the UE 10 over the radio interface via an antenna and one or more transceivers 30. The baseband information is processed in an HARQ controller 32 which detects successfully received PDUs and retires their corresponding HARQ processes. For incomplete HARQ processes, the HARQ controller 32 requests retransmission of the corresponding PDUs. The HARQ controller 32 sends the successfully received PDUs to a MAC controller 34 which performs reordering, reassembly, and logical channel de-multiplexing. The RLC controller 36 performs retransmission support and re-segmentation. A common uplink radio resource controller 38 controls the HARQ controller 32 and MAC controller 34 to detect whether to release the common E-DCH resource allocated to the UE 10. For error cases, like signaling errors or UEs moving out of coverage, the uplink radio resource controller 38 can use a release timer to release the common E-DCH resource. The uplink radio resource controller 38 can stop a UE from transmitting on a common E-DCH resource by sending a grant on the E-AGCH with the primary E-RNTI indicating INACTIVE on all HARQ processes.

Figure 6:
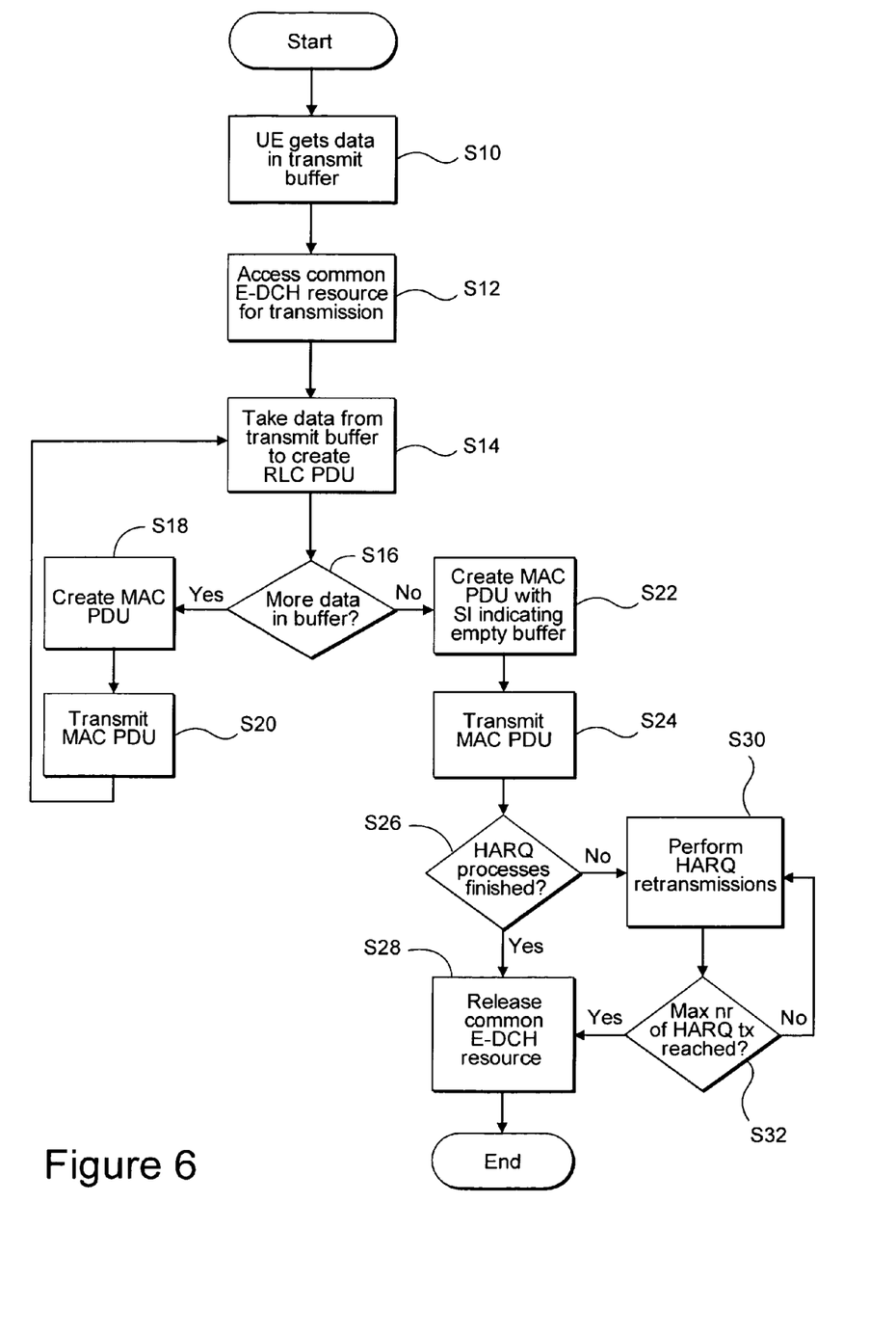
FIG. 6 is a flowchart illustrating non-limiting example steps that may be implemented in a UE for reliably and efficiently managing common E-DCH resources.

FIG. 6 is a flowchart illustrating non-limiting example steps that may be implemented in a UE, such as the non-limiting example UE shown in FIG. 5A, for reliably and efficiently managing common E-DCH resources. Initially, the UE receives data in a transmit buffer such as the buffer 14 shown in FIG. 5A (steps S10). The UE sends a message on the RACH to the base station requesting access to a common E-DCH resource for uplink transmission (step S12). The RLC controller 16 then takes data from its transmit buffer to create RLC PDUs (step S14). A decision is made in step S16 whether there is any more data in the RLC buffer 14. If so, the MAC controller 18 creates a MAC_PDU from the RLC_PDU (step S18). The MAC_PDU is then transmitted over the radio interface of the UE's transceiver (step S20) and control returns to step S14.

If there is no more data in the UE's transmit buffer 14, the MAC controller 18 creates a MAC_PDU that includes an indicator indicating that the mobile's transmit buffer is empty (step S22). The MAC controller 18 then provides that last MAC_PDU to the transceiver 22 for transmission over the radio interface (step S24). A decision is made in the UE in step S26 whether all of the HARQ processes for this UE uplink transmission have been completed (step S26). If they are, the UE releases the common E-DCH resource (step S28). If the HARQ processes are not finished, the HARQ controller 32 in the base station performs the necessary HARQ retransmissions for the still pending HARQ processes (step S30). A decision is made in step S32 whether a maximum number of HARQ (re)transmissions has been reached. If not, HARQ (re)transmissions are continued in step 30. But if the maximum number has been reached, the common E-DCH resource is released (step S28).

Figure 7:
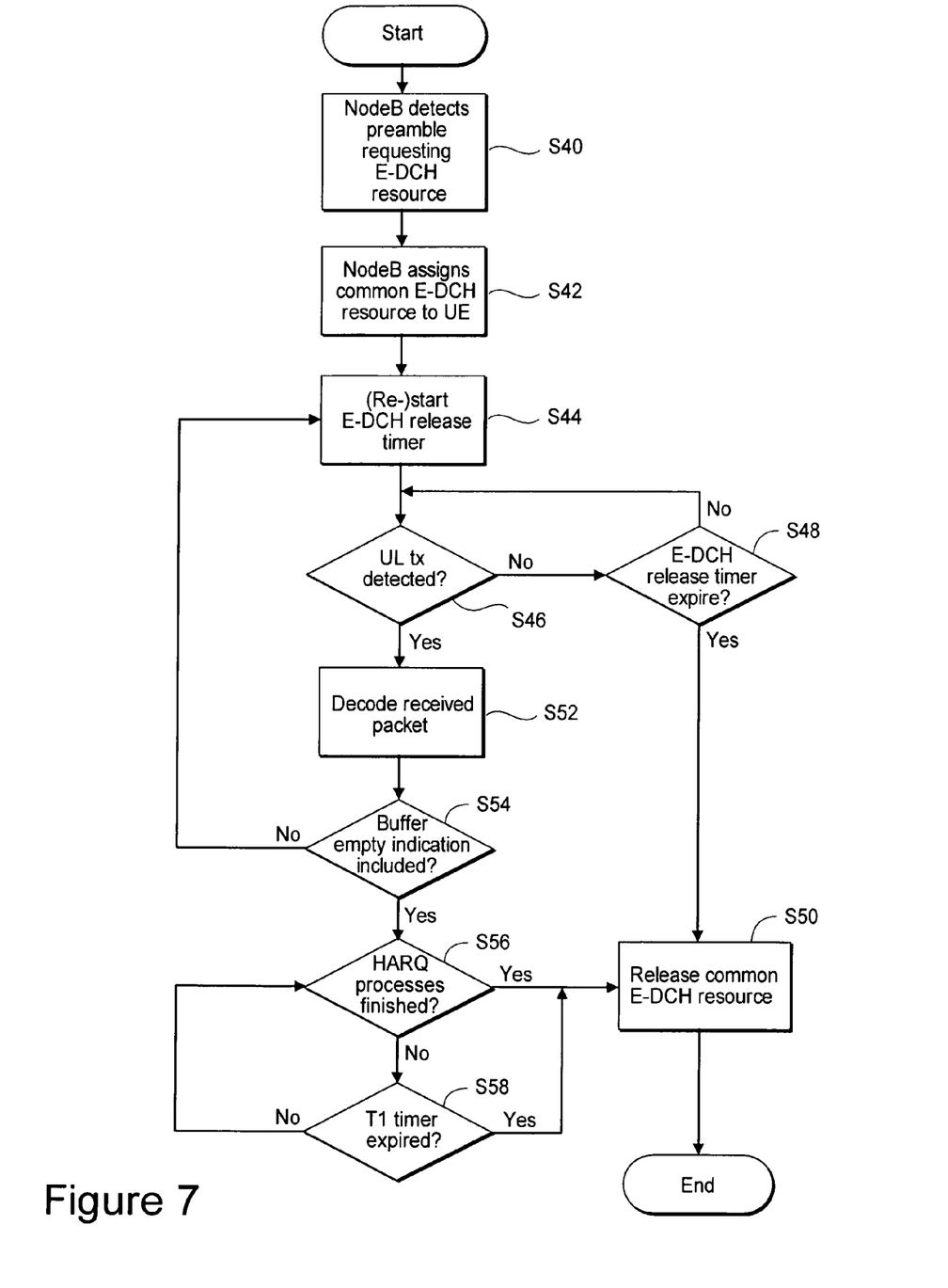
FIG. 7 is a flowchart illustrating non-limiting example steps that may be implemented in a base station for reliably and efficiently managing common E-DCH resources.

FIG. 7 is a flowchart illustrating non-limiting example steps that may be implemented in a base station/NodeB 12 for reliably and efficiently managing common E-DCH resources. The base station detects a preamble from a RACH message sent by the UE requesting the common E-DCH resource for uplink radio transmission (step S40). The common uplink resource controller 38 in the base station 12 assigns the common E-DCH resource to the UE 10 (step S42). The common uplink resource controller 38 starts or restarts an E-DCH release timer (step S44). A decision is made by the common uplink resource controller 38 whether an uplink transmission on the common E-DCH resource has been detected (step S46). If not, the common uplink resource controller 38 determines whether the E-DCH release timer has expired in step S48. If not, control returns to decision block (step S46). But if the timer is expired, the common uplink resource controller 38 releases the common E-DCH resource from the UE (step S50). If an uplink transmission is detected in the base station from the UE on the common E-DCH resource, the base station decodes the received packet (step S52). A decision is made by the common uplink resource controller 38, which receives buffer empty information from the MAC controller 34, whether the received packet includes a buffer empty indication (step 54). If not, the common uplink resource controller 38 restarts the E-DCH release timer in step S44, and processing continues on at step S46. But if a buffer empty indication is included in the received packet, the HARQ controller 32 determines whether the HARQ processes for this UE's uplink transmission have been completed (step S56). If so, the common E-DCH resource is released (step S50). If not, a decision is made whether a T1 timer has expired indicating that an HARQ processing time limit has expired (step S58). If so, the common uplink resource controller 38 releases the common E-DCH resource (step S50). If not, control returns to decision block S56.

Figure 8:
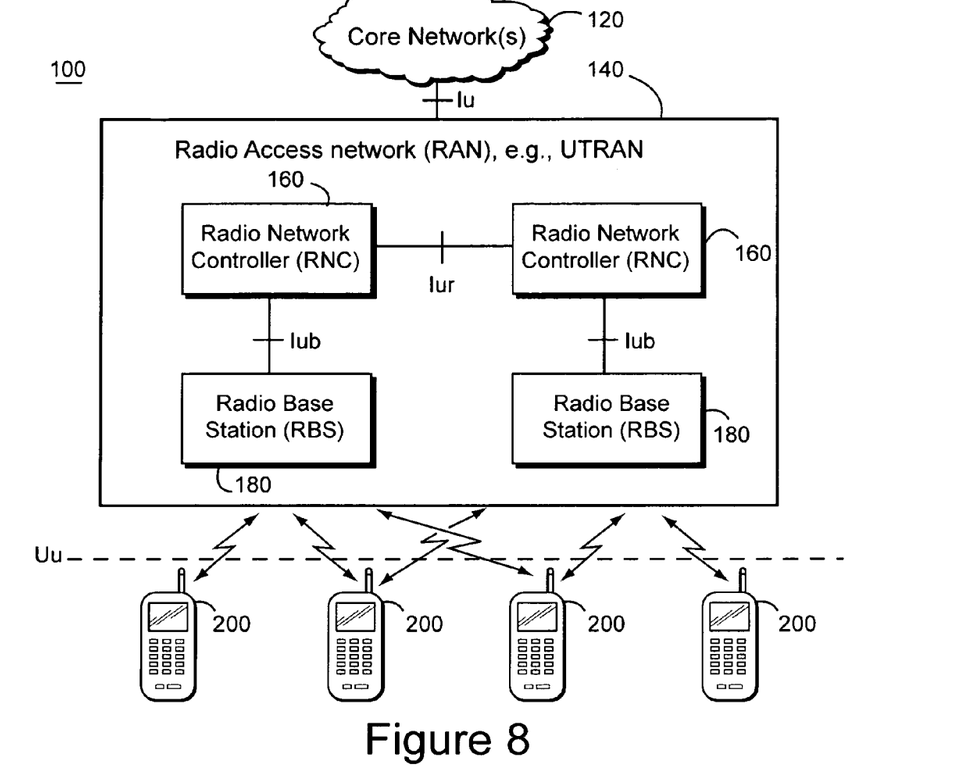
FIG. 8 is a non-limiting example function block diagram of a UMTS type radio communications system.

Referring to FIG. 8, a non-limiting example network 100 that supports a common E-DCH resource is illustrated. The UE 10 and the base station 12 may used in such a network 100, but they are not limited to use in this particular kind of network. Network 100 may accommodate one or more standard architectures including a universal mobile telecommunications system (UMTS) and other systems based on code division multiple access (CDMA), GPRS/EDGE and other systems based on time division multiple access (TDMA) systems, LTE and other systems based on orthogonal frequency division multiplexing (OFDM), etc. The network 100 includes a radio access network (RAN) 140 and one or more core network(s) 120. One non-limiting example radio access network is the UMTS terrestrial access network (UTRAN) used in third generation cellular systems. Core network 140 supports circuit-based communications and packet-based communications. The RAN 140 may include (but does not require) one or more radio network controllers (RNCs) 160. The technology in this case may be applied to other RANs, such as those used in LTE and WiMax, that do not employ RNCs. Each RNC (if used) is coupled to one or more radio base stations (RBSs) 180 sometimes referred to as NodeB's. The communications interface between Node Bs and RNCs is referred to as the Iub interface, and the communications interface between RNCs is referred to as the Iur interface. Transport of information over the Iub and Iur interfaces is typically based on asynchronous transfer mode (ATM) or Internet Protocol (IP), for example. User equipment (UE) terminals 200 (also referred to hereafter as mobile terminals) communicate over an air or radio interface with the RAN 140. The radio interface is referred to as the Uu interface. The two center mobile terminals are shown communicating with both RBSs 180.

The RAN 140 supports both high speed downlink packet access (HSDPA) and high speed uplink packet access (HSUPA), also referred to as "enhanced uplink" and as enhanced uplink dedicated channel (E-DCH). As explained above, enhanced uplink employs several uplink channels including the enhanced dedicated physical data channel (E-DPDCH) carrying enhanced uplink data (at higher bit rates) in addition to the normal dedicated physical data channels (DPDCHs) used for regular uplink data communication. The dedicated physical control channel (DPCCH) carries pilot symbols and out-of-band control signaling, and the enhanced dedicated physical control channel (E-DPCCH) carries uplink scheduling requests.

Figure 9:
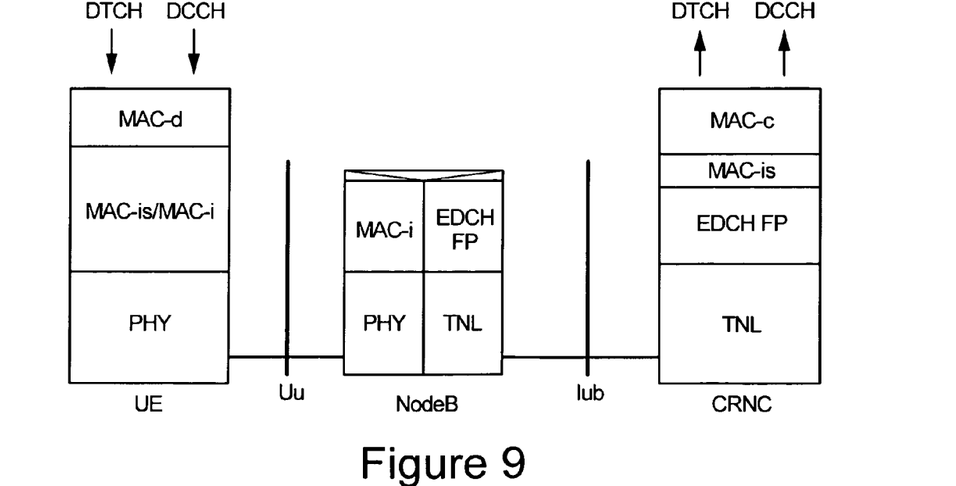
FIG. 9 is a non-limiting example communications protocol diagram for the non-limiting example shown in FIG. 8.

FIG. 9 illustrates a non-limiting example protocol architecture for supporting efficient and reliable use and release of the common E-DCH resource by UEs. The UE uses the MAC-i protocol to transmit the Scheduling Information (SI) field indicating an empty buffer to the NodeB, thus implicitly indicating that it will release the common E-DCH resource after successful completion of all HARQ processes. The NodeB uses the physical control channel E-AGCH, terminated in the PHY layer, to explicitly indicate the release of the common E-DCH resources to the UE.

The technology in this application provides many different ways to efficiently use and release a common uplink radio resource like the common E-DCH resource. Several example embodiments use existing message fields and timers to accomplish these ends. Several example embodiments also enhance the reliability of the release by providing an opportunity for all HARQ processes to complete even though a UE buffer empty indicator is signaled and/or by using one or more timers to ensure that release is not held up for too long. Also, the fact that the scheduling information is included in the MAC-i header means that it is covered by the HARQ transmissions, thus making the indication very reliable. The added possibility for the base station to explicitly release common E-DCH resources by using the E-AGCH provides a good mechanism for managing common E-DCH resources. For instance, in case of overload, the base station can use the explicit release mechanism to quickly free up resources.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method implemented in a radio base station of releasing a common Enhanced Dedicated Channel (E-DCH) resource allocated for use by a User Equipment (UE) in a CELL_FACH state, comprising:

the radio base station determining that the common E-DCH resource allocated to the UE should be released; and the radio base station sending an inactive grant on a E-DCH resource grant channel to the UE instructing the UE to release the common E-DCH resource, wherein the inactive grant on the E-DCH resource grant channel means that the release is executed even though there are outstanding unfinished Hybrid Automatic Repeat Request (HARQ) processes associated with the UE's transmission to the base station using the allocated common E-DCH resource.

2. The method according to claim 1, further comprising:

setting a release timer with a predetermined value associated with the common E-DCH resource; and releasing the common E-DCH resource upon expiry of the release timer.

3. Radio base station apparatus for releasing a common Enhanced Dedicated Channel (E-DCH) resource in a radio base station allocated for use by a User Equipment (UE) in a CELL_FACH state, comprising electronic circuitry arranged to:

determine that the common E-DCH resource allocated to the UE should be released; and send an inactive grant on a common E-DCH resource grant channel instructing the UE to release the common E-DCH resource, wherein the inactive grant on the common E-DCH resource grant channel means that the release is executed even though there are outstanding unfinished Hybrid Automatic Repeat Request (HARQ) processes associated with the UE's transmissions to the base station using the allocated common E-DCH resource.

4. The radio base station apparatus according to claim 3, further comprising:

a release timer with a predetermined value associated with the common E-DCH resource, wherein the electronic circuitry is arranged to release the common E-DCH resource upon expiry of the release timer.

* * * * *

UNITED STATES PATENT AND TRADEMARK OFFICE
CERTIFICATE OF CORRECTION

PATENT NO. : 8,218,488 B2
APPLICATION NO. : 12/314247
DATED : July 10, 2012
INVENTOR(S) : Wager et al.

Page 1 of 1

It is certified that error appears in the above-identified patent and that said Letters Patent is hereby corrected as shown below:

In the Specification:

In Column 4, Line 45, delete "UEs is" and insert -- UEs --, therefor.

In the Claims:

In Column 12, Line 13, in Claim 1, delete "transmission" and insert -- transmissions --, therefor.

Signed and Sealed this
Seventeenth Day of December, 2013

Margaret A. Focarino
*Commissioner for Patents of the United States Patent and Trademark Office*